March 5, 1957 E. I. WILSON 2,783,606
WINDROW DIVIDER AND BALER PICKUP EXTENSION
Filed April 9, 1954 2 Sheets-Sheet 1
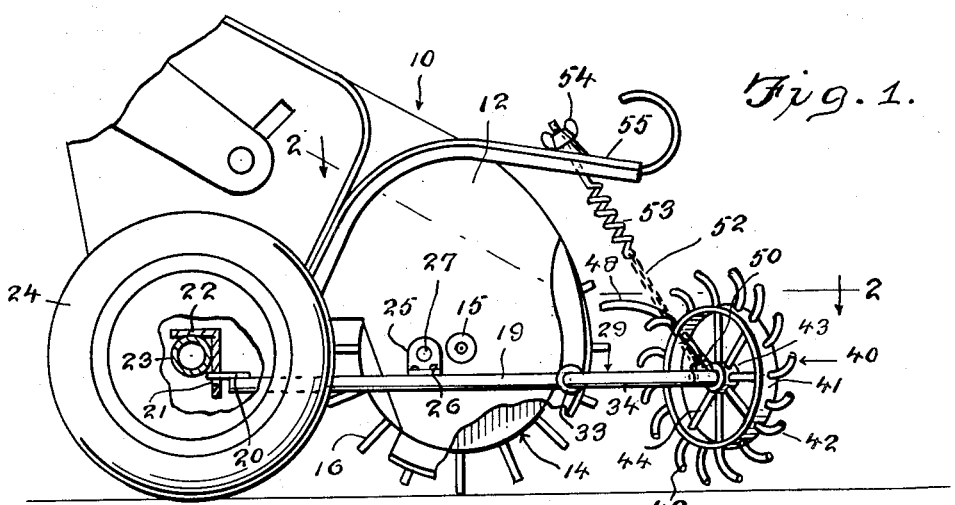
Fig. 1.
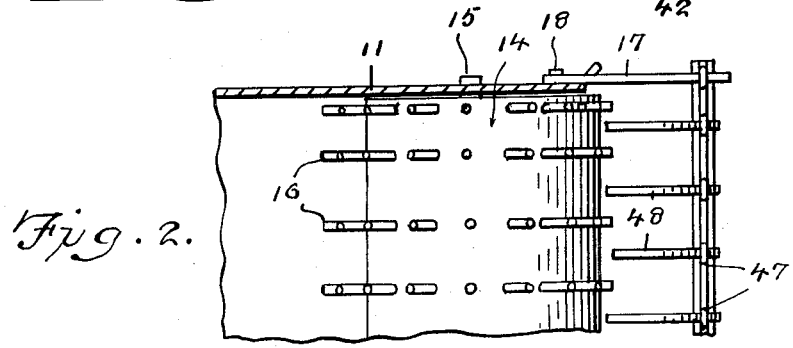
Fig. 2.
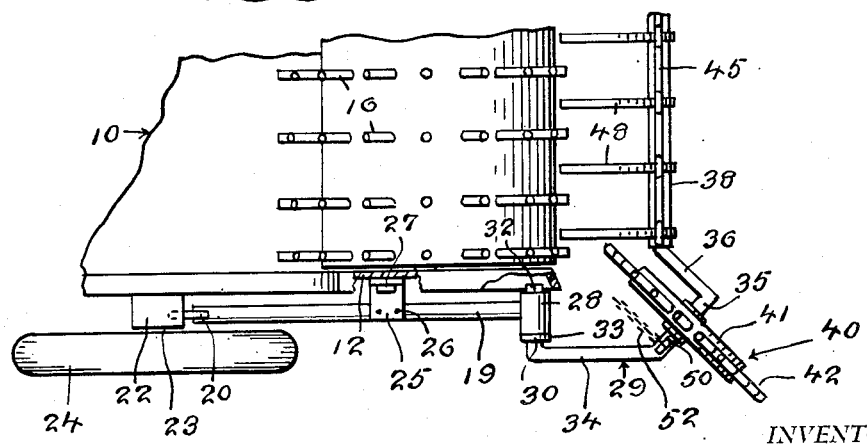
INVENTOR.
Eugene I. Wilson
BY Victor J. Evans & Co.
ATTORNEYS

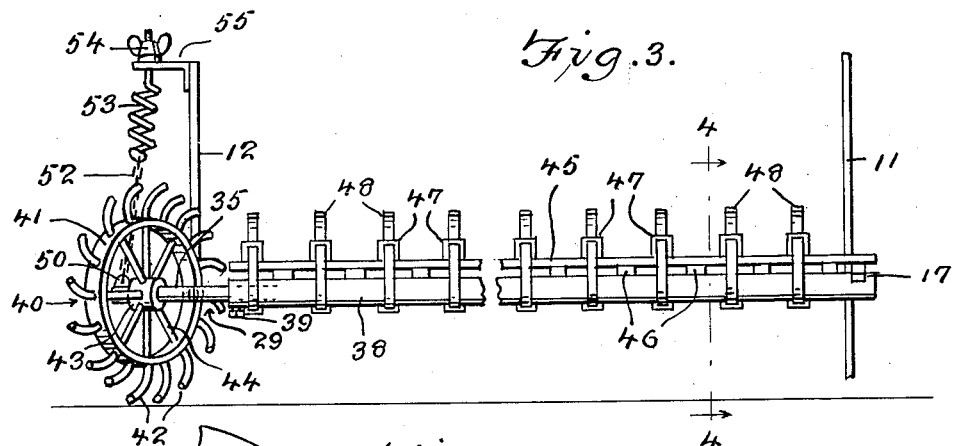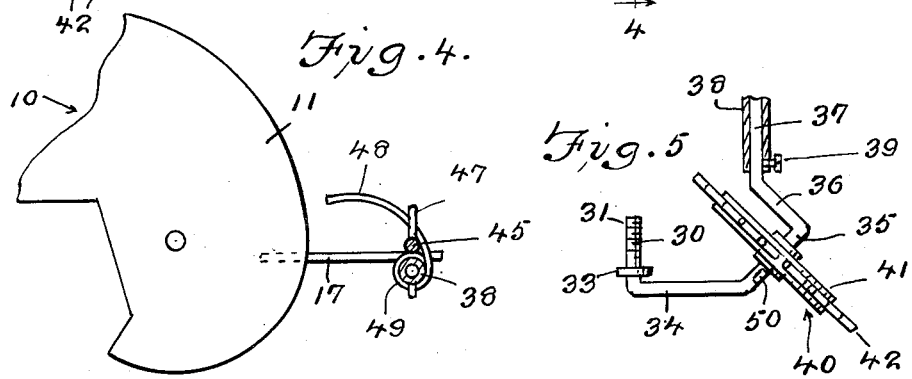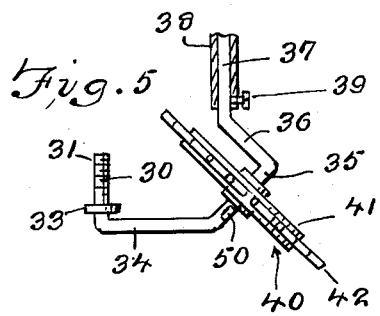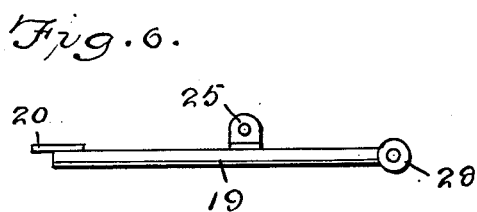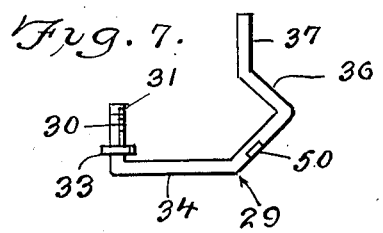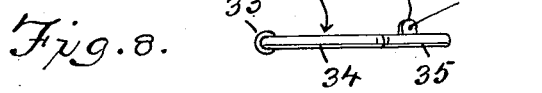

United States Patent Office 2,783,606
Patented Mar. 5, 1957

2,783,606

WINDROW DIVIDER AND BALER PICKUP EXTENSION

Eugene I. Wilson, Buffalo, S. Dak.

Application April 9, 1954, Serial No. 422,025

2 Claims. (Cl. 56—364)

This invention relates to agricultural equipment, and more particularly to a windrow divider and pickup extension for a hay baler.

The object of the invention is to provide an attachment for a hay baling machine which will permit balers to pickup or cut a wider swath through a windrow and which will also prevent hay from rolling ahead of the baler or blowing away.

Another object of the invention is to provide an attachment for hay balers which will widen or increase the amount of hay that can be picked up from the windrow and which will also divide the windrow in the event that the windrow is too wide for one swath of the baler, there being a plurality of slats or fingers for preventing the hay from rolling ahead of the baler pickup and for also preventing the hay from blowing away on windy days.

Another object of the invention is to provide a windrow divider and baler pickup extension which will eliminate the necessity of using a tractor and side delivery rake since on wide windrows a larger swath or cut can be made in the windrows whereby there will be effected an economy in time as well as a saving in cost during the baling of the hay.

A further object of the invention is to provide a windrow divider and baler pickup extension which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing a portion of a hay baler with the windrow divider and baler pickup extension mounted thereon, and with parts broken away and in section.

Figure 2 is a fragmentary top plan view of the front end of the baler showing the attachment of the present invention thereon, and with parts broken away and in section and taken on line 2—2 of Figure 1.

Figure 3 is a front elevational view of the present invention.

Figure 4 is a sectional view taken on the line 4—4 of Figure 3.

Figure 5 is a top plan view of the wheel mounting means, with parts broken away and in section.

Figure 6 is a side elevational view of a mounting bar.

Figure 7 is a plan view of the body member for supporting the wheels.

Figure 8 is a side elevational view of the mounting member shown in Figure 7.

Referring in detail to the drawings, the numeral 10 designates a portion of a hay baler which includes a frame that embodies a pair of spaced parallel side members 11 and 12 which are vertically disposed. Journaled between the side members 11 and 12 of the frame and positioned forwardly of the hay baler is a drum 14, the drum 14 being journaled in the side members by means of trunnions 15, Figures 1 and 2. A plurality of radially extending fingers or teeth 16 are secured to the drum 14, whereby as the drum 14 is rotated the teeth 16 will cause the hay to be carried rearwardly and deposited in conventional equipment for baling the hay. The present invention is not concerned with the specific type of mechanism for baling the hay, but is only directed to an attachment for the front of the hay baler whereby a wider swath can be cut through the windrows and whereby hay will be prevented from rolling away or blowing away on windy days.

The attachment of the present invention includes a horizontally disposed arm 17 which may be connected to the side member 11 by means of a bolt and nut assembly or pin 18, Figure 2. There is further provided a bar 19 which has a securing element such as a bolt 20 secured to its rear end. The bolt 20 projects through an opening 21 in an L-shaped bracket 22, and the bracket 22 may be secured as by welding to an axle housing 23. The axle housing 23 leads to wheels 24, Figures 1 and 2. The opening 21 is slightly larger than the bolt 20 whereby adjustment or slight pivotal movement of the bar 19 can be effected or accomplished. An L-shaped support member 25 is secured to the upper surface of the bar 19 by suitable securing elements 26, and the support member 25 is pivotally connected to the side member 12 by means of a pin or bolt and nut assembly 27.

Arranged on the front end of the bar 19 and secured thereto is a hollow open ended sleeve 28 which receives a first portion 30 of a body member 29. The portion 30 is threaded exteriorly as shown in Figure 7, and a suitable securing element such as a nut 32 is arranged in threaded engagement with the portion 31 for maintaining the parts in their proper assembled relation. The body member 29 further includes a collar 33 which is secured to the first portion 30, and the collar 33 abuts one end of the sleeve 28. Arranged at right angles with respect to the first portion 30 is a second portion 34, and the body member 29 further includes a third portion 35 which is arranged angularly with respect to the portion 34. A straight portion 36 is arranged at right angles with respect to the portion 35 of the body member, and there is provided an end portion 37 which projects into an open end of a hollow tube 38. A suitable set screw 39 is arranged in engagement with the tube 38 and engages the end portion 37 of the body member for maintaining the body member and tube 38 connected together.

Rotatably mounted on the portion 35 of the body member 29 is a wheel 40. It will be seen that the wheel 40 is arranged outwardly and angularly with respect to the longitudinal axis of the baler, as shown in Figures 2 and 3, so that the effective width of a swath being cut through the windrow will be increased. In other words without the use of the wheel 40, the baler would only pickup the hay that is positioned between the ends of the drum 14, but by using the wheel 40, an additional amount of hay will be guided onto the pickup drum 14 since the wheel 40 extends outwardly and angularly with respect to the front of the baler. The wheel 40 includes an annular rim 41 which has a plurality of curved fingers or teeth 42 projecting therethrough, and the teeth 42 serve to cut through the windrow and insure that all of the hay to the left of the wheel 40 as shown in Figure 2 will be guided onto the drum 14. The wheel 40 further includes an inner collar 43 which is connected to the rim 41 by radially disposed spokes 44.

Positioned above the tube 38 is a horizontally disposed rod 45, Figure 3, and a plurality of spacer members 46 are interposed between the rod 45 and the tube 38, and these spacer members 46 may be secured to the rod and tube in any suitable manner. Projecting upwardly from the rod 45 and secured thereto is a plurality of U-shaped clips or brackets 47, and extending through each of the clips 47 is a finger or slat 48. The upper portions of the slats 48 are curved slightly as shown in Figure 4, and the clips 47 maintain the slats 48 in their proper position with respect to the drum 14. Each of the slats 48 includes a lower curved portion 49 which surrounds a portion of the tube 38. The slats 48 help to hold the hay down as the baler is traveling along the field, and the slats 48 are especially useful when light hay is being baled since on windy days such light hay has a tendency to blow away, but with the use of the slats 48 the hay is kept down and thus guided into the path of the drum 14 whereby it can be readily picked up and conveyed back to the usual hay baling mechanism on the machine. The other end of the tube 38 may be secured to the front end of the arm 17 whereby the attachment is supported on both ends of the baler.

The body member 29 is provided with an ear or lug 50, Figure 8, and the ear 50 is provided with an aperture 51. The lower end of a chain 52 is arranged in engagement with the aperture 51, and a coil spring 53 is connected to the chain 52, the coil spring 53 being connected to a bracket 55 by means of a securing element assembly 54, Figure 3. The bracket 55 may be secured to any suitable portion of the baler frame. Thus, by adjusting the tension of the chain 52 or spring 53, the elevation of the wheel 40 can be varied and in use the tension of the spring 53 is such that the teeth 42 just touch the ground as shown in Figures 1 and 3.

From the foregoing it is apparent that there has been provided an attachment for a hay baler which will permit wider cuts to be made in the windrow and which will also keep all of the hay in the path of the pickup drum 14. Thus, it will be seen that the wheel 40 is arranged angularly and outwardly with respect to the front end of the baler so that a larger than usual cut will be made in the windrow. Ordinarily the drum 14 would only cut a swath in the windrow according to its own length but due to the provision of the wheel 40 a wider swath will be cut since the wheel 40 projects outwardly to thereby guide towards the drum 14 an additional amount of hay that has been stacked or cut. The teeth 42 on the wheel 40 are arranged so that they just touch the ground and this adjustment is brought about by means of the bolt and nut assembly 54 which controls the tension on the coil spring 53. In addition the present invention also serves to insure that the hay will be held down in the path of the drum 14 so that it is more easily picked up and carried rearwardly to the baling mechanism. Thus, it will be seen that the slats or fingers 48 will hold down the hay therebelow so that it can be more easily picked up by the teeth 16 on the drum 14. These slats 48 are especially useful when handling light hay, that is hay which is light in weight, since the slats 48 will prevent this type of hay from being accidentally blown away out of the path of the baling mechanism by a high wind and the like.

Most balers have a pickup from 48 to 57 inches wide which is quite narrow for most hay windrows but with the present invention the pickup will be widened and also windrows will be divided that are too wide for one swath of the baler. The slats 48 keep hay, especially light hay, from rolling ahead of the baler pickup and also keep the hay from blowing away on windy days. Usually hay is racked in regular windrows and without the present invention it is necessary to have an extra man operate a tractor and side delivery rake but with the attachment of the present invention the hay can be baled without using a side delivery rake to thereby effect a considerable economy. On wide windrows a person can take part of the windrow at a time, that is a wider swath can be cut and also, the hay will be prevented from falling around the sides of the baler pickup.

I claim:

1. In a baler, a frame including a first and second vertically disposed side member arranged in spaced parallel relation with respect to each other, a drum journaled between said side members, a plurality of teeth extending outwardly from said drum and secured thereto, an arm secured to said first side member and projecting forwardly therefrom, an L-shaped bracket secured to said frame and provided with an opening therein, a bar arranged contiguous to the outer surface of said second side member, a securing element extending from the rear end of said bar and projecting through the opening in said bracket, a support member connecting said bar to said second side member, a sleeve secured to the front end of said bar, a body member including a straight portion projecting through said sleeve, a wheel mounted on said body member and including a plurality of curved teeth extending outwardly therefrom, a hollow tube having one end connected to said body member, the other end of said tube being connected to the front end of said arm, chain and spring means connecting said body member to said baler frame, a horizontally disposed rod positioned above said tube, a plurality of spaced parallel spacer members interposed between said tube and rod and secured thereto, a plurality of clips secured to the upper surface of said rod, slats projecting through said clips and each including upper curved portions, portions of said slats being trained over said tube and secured thereto, said body member comprising a first portion extending through said sleeve and provided with a threaded end, a second portion arranged at right angles with respect to said first portion, a third portion arranged angularly with respect to said second portion, said wheel being mounted on said third portion whereby said wheel is arranged angularly with respect to the longitudinal axis of the baler, a fourth portion arranged at right angles with respect to said third portion, and a fifth portion projecting from said fourth portion and extending into said tube.

2. In a baler, a frame including a first and second side member, a drum journaled between said side members, teeth extending outwardly from said drum and secured thereto, an arm secured to said first side member and projecting forwardly therefrom, a bracket secured to said frame and provided with an opening therein, a bar arranged contiguous to the outer surface of said second side member, a securing element extending from said bar and projecting through the opening in said bracket, a support member connecting said bar to said second side member, a sleeve secured to said bar, a body member including a straight portion projecting through said sleeve, a wheel mounted on said body member and including a plurality of teeth extending outwardly therefrom, a tube having one end connected to said body member, the other end of said tube being connected to the front end of said arm, chain and spring means connecting said body member to said baler frame, a rod positioned above said tube, a plurality of spacer members interposed between said tube and rod and secured thereto, a plurality of clips secured to said rod, slats projecting through said clips and each including upper curved portions, portions of said slats being trained over said tube and secured thereto, said body member comprising a first portion extending through said sleeve and provided with a threaded end, a second portion arranged angularly with respect to said first portion, a third portion arranged angularly with respect to said second portion, said wheel being mounted on said third portion whereby said wheel is arranged angularly with respect to the longitudinal axis of the baler, a fourth portion arranged angularly with respect to said third portion, and a fifth portion projecting from said fourth portion and extending into said tube.

References Cited in the file of this patent

UNITED STATES PATENTS

| 1,877,770 | Larson | Sept. 20, 1932 |
| 2,524,233 | Russell | Oct. 3, 1950 |
| 2,654,209 | Raney | Oct. 6, 1953 |
| 2,657,519 | Hill | Nov. 3, 1953 |
| 2,731,782 | Mason | Jan. 24, 1956 |

FOREIGN PATENTS

| 19,559 | Great Britain | Aug. 1, 1907 |